(12) United States Patent
Barrett et al.

(10) Patent No.: US 12,195,167 B2
(45) Date of Patent: *Jan. 14, 2025

(54) ACOUSTIC NOISE SUPPRESSING DUCTED FAN PROPULSOR MOUNTING ARRANGEMENT AND TREATMENTS

(71) Applicant: University of Kansas, Lawrence, KS (US)

(72) Inventors: Ronald Martin Barrett, Lawrence, KS (US); Lauren Nicole Schumacher, Rolla, MO (US); Patrick Ian McNamee, Topeka, KS (US); John Austin Haug, Austin, TX (US); Joshua Donald Mudd, Port St. Lucie, FL (US); Dalton Bastiaan Prins, Clovis, CA (US); Nicholas Donald Werner, Overland Park, KS (US)

(73) Assignee: University of Kansas, Lawrence, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/451,619

(22) Filed: Aug. 17, 2023

(65) Prior Publication Data
US 2023/0406483 A1    Dec. 21, 2023

Related U.S. Application Data

(63) Continuation of application No. 17/047,779, filed as application No. PCT/IB2019/053149 on Apr. 16, 2019, now Pat. No. 11,767,097.
(Continued)

(51) Int. Cl.
*B64C 11/00* (2006.01)
*B64C 33/00* (2006.01)
(Continued)

(52) U.S. Cl.
CPC .......... *B64C 11/008* (2013.01); *B64C 11/001* (2013.01); *B64C 33/00* (2013.01);
(Continued)

(58) Field of Classification Search
CPC ..... B64C 11/001; B64C 11/008; B64C 27/20; B64C 33/00; B64D 2033/0206; F01D 25/04
See application file for complete search history.

(56) References Cited

U.S. PATENT DOCUMENTS

| 1,551,877 A | 9/1925 | Henning |
| 1,871,015 A | 8/1932 | Squires |

(Continued)

FOREIGN PATENT DOCUMENTS

KR    101790281 B1    10/2017

OTHER PUBLICATIONS

Patent Cooperation Treaty, International Search Report and Written Opinion issued for PCT Application No. PCT/IB2019/053149, dated Sep. 4, 2019, 9 pages.

*Primary Examiner* — Jesse S Bogue
(74) *Attorney, Agent, or Firm* — Norton Rose Fulbright US LLP

(57) ABSTRACT

A general mounting method for ducted fan propulsors is disclosed. This mounting method uses extremely slender stators that connect the duct ring to the propulsor which is mounted in the middle and drives the rotor, fan or propeller. The slender stators take the form of spokes and as such are so slender that the midspan stresses within the spokes are dominated by axial tension loads rather than the shear loads experienced by conventional stators. The spokes may have an aerodynamic shape and damping methods may be used to retard spoke vibrations and transmission of engine vibrations to the duct and force. The duct itself is also stiffened by the spoke arrangement, thereby reducing low frequency vibration modes.

20 Claims, 6 Drawing Sheets

Related U.S. Application Data

(60) Provisional application No. 62/659,026, filed on Apr. 17, 2018.

(51) Int. Cl.
 *F01D 25/04* (2006.01)
 *B64C 27/20* (2023.01)

(52) U.S. Cl.
 CPC .............. *F01D 25/04* (2013.01); *B64C 27/20* (2013.01); *F05D 2260/96* (2013.01)

(56) References Cited

U.S. PATENT DOCUMENTS

| | | | |
|---|---|---|---|
| 2,118,052 A | 5/1938 | Odor | |
| 2,929,580 A | 3/1960 | Ciolkosz | |
| 2,953,321 A | 9/1960 | Robertson et al. | |
| 3,127,093 A * | 3/1964 | Sudrow | F04D 29/386 |
| | | | 416/240 |
| 4,371,133 A | 2/1983 | Edgley | |
| 4,802,823 A | 2/1989 | Decko et al. | |
| 6,270,038 B1 | 8/2001 | Cycon et al. | |
| 6,450,445 B1 * | 9/2002 | Moller | B64C 39/024 |
| | | | 244/12.6 |
| 7,681,832 B2 | 3/2010 | Colclough | |
| 7,850,116 B2 | 12/2010 | Stuhr | |
| 8,960,592 B1 | 2/2015 | Windisch | |
| 10,435,145 B1 * | 10/2019 | Finnell | H02J 50/20 |
| 10,814,966 B2 | 10/2020 | Rowe et al. | |
| 10,974,823 B2 | 4/2021 | Van Niekerk et al. | |
| 2003/0098388 A1 | 5/2003 | Walmsley | |
| 2008/0253892 A1 * | 10/2008 | Dehlsen | F03D 1/0608 |
| | | | 416/204 R |
| 2009/0014581 A1 | 1/2009 | Kebrle et al. | |
| 2010/0108809 A1 | 5/2010 | Bouldin et al. | |
| 2011/0001017 A1 | 1/2011 | Burdisso | |
| 2012/0051914 A1 * | 3/2012 | Dehlsen | F03D 7/0228 |
| | | | 416/147 |

\* cited by examiner

ACOUSTIC NOISE SUPPRESSING DUCTED FAN PROPULSOR MOUNTING ARRANGEMENT AND TREATMENTS

CROSS REFERENCE TO RELATED APPLICATION

This application is a continuation of U.S. patent application Ser. No. 17/047,779 filed Oct. 15, 2020, which is a national stage entry of PCT Application No. PCT/IB2019/053149 filed Apr. 16, 2019, which claims the benefit of priority of U.S. Provisional Patent Application No. 62/659,026 filed Apr. 17, 2018, the disclosures of which are hereby incorporated by reference in their entirety.

GOVERNMENT INTEREST

This invention was made with government support under Grant No. DTOS59-06-G-awarded by the Department of Transportation. The government has certain rights in the invention.

TECHNICAL FIELD

The present invention relates to a techniques for mounting propellers, fans, rotor propulsors, and the like within a duct and more specifically to a mounting technique that utilizes a plurality of spokes to physically restrain a central propulsor, preswirl the flow, and provide high levels of dimensional stability to the duct while damping out sounds and vibrations.

BACKGROUND

For more than a hundred years, axial fans have been used for a variety of purposes. Perhaps the most famous early use of an axial fan was by the Wright Brothers in 1901 when they built their first wind tunnel to test the effects of wing planform shape and aspect ratios. This wind tunnel was powered by a two-bladed rotor driven by an overhead belt drive. A fan was mounted within an outer duct and supported by four downstream stators between which was mounted the fan shaft and bearing assembly. The stators had comparatively large chords with respect to their lengths. When considering the aspect ratio of the stators (the length divided by the chord), the stators exhibited aspect ratios below 4.

Twenty years after the Wright Brothers first used an axial fan to power their wind tunnel, Henning described a very similarly configured fan assembly in U.S. Pat. No. 1,551,877 which was used to disperse dust clouds for agricultural crop dusting. As with the Wright Brother's wind tunnel, four large-chord stators were used to mount the central propeller shaft. Once again, the stators were primarily loaded in shear and possessed aspect ratios below 4.

The interwar period also saw the use of ducted fans for airplane propulsion. For example, in U.S. Pat. No. 2,118,052, Odor utilizes the basic design of the Wright Brothers in two-bladed propellers mounted within a duct. The internal combustion engine was mounted within the duct by a small number of stators mounted downstream of the propeller. Each stator had comparatively large chords and had aspect ratios well under 4.

Ducted fans appeared in several World War II era secret German designs which were never fully realized in flight-worthy aircraft, but went through initial development. Among the most famous of these designs were the Heinkel Wespe and Lerchle of 1943-45. Once again, the rotors were mounted between just three large-chord stators which supported the duct upstream and three large-chord, low aspect ratio stators downstream.

After the war, a plethora of vertical take-off and landing ducted aircraft were conceived and took to the air. Piasecki Aircraft Corp. supported the work of Ciolkosz and U.S. Pat. No. 2,929,580. Once again, the Wright Brother's basic ducted fan configuration was used in a four-bladed propeller arrangement supported by four wide-chord stators exhibiting aspect ratios under 5. Among the most famous ducted fan designs of this era was the Hiller VZ-1 family of aircraft, which is described in U.S. Pat. No. 2,953,321. This family of aircraft employed counter-rotating rotor assemblies mounted within a duct by a small number of large-chord, low aspect ratio stators.

While wing-in fan airplanes, jet-jeeps, blimps, and many other kinds of aircraft were using ducted fans, several characteristics remained fundamentally unchanged. Sudrow's efforts, which are described in U.S. Pat. No. 3,127,093 were emblematic of the many types of counter-rotating ducted fan designs. The rotors were mounted within a duct by a small number of wide-chord, low aspect ratio stators (four in this case). Once again, the basic stator design of the Wright Brothers can still be seen echoing forward in time as the wide-chord stators transferred thrust loads primarily via shear loads within the stators.

Some lifting fan designs went to great extremes to tailor inflow and outflow characteristics via pluralities of nested radial and annular stators as shown in U.S. Pat. No. 4,796,836 to Buchelt. Again, both the radial and annular stators shown are low in aspect ratio with wide-chords.

Some nontrivial attention to stator design was paid to rotating components in jet turbine designs. For example, in U.S. Pat. No. 4,802,823 Decko describes internal components of low aspect ratio stators intended for the support of rotating jet engine components which have a basic form factor not unlike that used by the Wright brothers nearly 90 years earlier.

In U.S. Pat. No. 6,450,445 B1, Moller employs low aspect ratio, large-chord stators mounting rotors within duct assemblies. Unlike his predecessors, however, he includes a powerplant in the middle of the duct and a plurality of stacked rotor-stator pairs in the streamwise direction. In this design, both the powerplant and therefore indirectly the rotor system are held in place by the low aspect ratio stators.

A low aspect ratio stator system was also described by Cycon in U.S. Pat. No. 6,270,038 B1. This design, also uses low aspect ratio stators to hold a central hub assembly at the center of two ducted fans. As is the case with many designs, this configuration also has louvers downstream of the rotor to deflect the slipstream in various directions. These louvers, like the stators, are low in aspect ratio.

While Cycon's '038 Patent describes stub wings attached to a ducted fan, Colclough, in his U.S. Pat. No. 7,681,832 B2, describes a ducted fan with stators of even lower aspect ratio than taught by the Wright Brothers. Like the '038 Patent, Colclough's '832 Patent also discloses an internal combustion powerplant mounted within the duct, driving a low aspect ratio rotor downstream of the stators, but with deployable wings. The low aspect ratio stators were used not only to hold the rotor shaft, but the powerplant itself. Like Cycon's '038 Patent, Colclough's '832 Patent also has low aspect ratio surfaces lying in the slipstream of the fan, just downstream of the end of the duct.

Even some modern ducted fan designs, such as the design described in U.S. Pat. No. 8,960,592 B1, describe low aspect ratio fans ganged together. In keeping with the standard ducted fan design laid down by the Wright Brothers, the fan shaft and bearing assemblies are supported by low aspect ratio stators.

As shown above, although ducted fan assemblies have been used for more than a hundred years, nearly all ducted fan assemblies utilize comparatively large chord, low aspect ratio stators. These stators are used to transfer loads from the outer duct to a central bearing and/or shaft assembly. FIG. 1 shows a typical ducted fan assembly in accordance with the prior art. As shown in FIG. 1, for a typical conventional ducted fan assembly, the outer duct (10), is often annular in shape and most frequently has a rounded inlet lip. This feature tends to keep flows attached and comparatively orderly as the flow enters the device. In the middle of the duct lies a mechanism which enables the rotation of the fan, impeller, propeller or propulsor blades. This central shaft assembly (20) often includes bearing assemblies of various kinds including needle and/or thrust bearings which can accept and transfer loads. Some conventional designs contain a powerplant, motor or engine of various kinds (30). Electric, internal combustion and/or turbine powerplants have all been used. From time to time, external shafts provide mechanical power and often penetrate the side of the central assembly (20), then lead to axial rotor rotation via a 90 degree gear assembly. The gear assembly and/or powerplant turn a fan, impeller, propeller or propulsor of one or more blades (40). Sometimes these impeller assemblies have multiple stages and/or are counter-rotating. Upstream and/or downstream of the impeller assemblies lie one or more stator assemblies (50). These stators typically transfer thrust, inertial and vibration loads between the outer duct and the central shaft assembly (20). Because the stators typically have comparatively large chords relative to their lengths, they pass loads between the duct and the central shaft assembly via shear and bending moments within the stator structure. Such mounting typically means that the stator integration is often part of the permanent mount and extremely difficult to trim, true, balance and/or replace. Additionally, vibration loads generated by the central shaft assembly (20) and/or powerplant (30) are frequently transferred with very little loss in energy to the surrounding structure, including the outer duct (10).

SUMMARY

The Acoustic Noise Suppressing Ducted Fan Propulsor Mounting Arrangement deviates significantly from more than a hundred years of ducted fan history. The first and foremost feature of the mounting arrangement is that the aspect ratio of the stators is high rather than low. In the preferred embodiment, the stators take the form of spokes with axial length-to-width ratios (also known as aspect ratios) in excess of 10.

Because the propulsor, fan, or rotor is mechanically connected through a bearing assembly, shaft and/or powerplant supported by a plurality of spokes, the spokes themselves are all pretensioned. Indeed, the primary stresses within the spokes are neither shear nor bending moment dominated, but rather almost purely axial tension dominated, especially in the mid-spans. These tensile loads are significantly different than the loads found in nearly all of the ducted fan stators that have been used for more than a hundred years.

Because the stators are loaded in tension, they have a head or grapple mechanism that allows one end to be attached to a shaft, bearing assembly and/or powerplant within the duct. The other end of the spoke contains a physical mechanism which allows the spoke to be tightened and otherwise adjusted Such an adjustment mechanism may take the form of either an end screw or nut or threaded female sleeve. Such an end nut may be tightened so as to very precisely trim and center the shaft, bearing assembly and/or rotor within the duct.

Because slender members like spokes can be prone to vibrate like plucked guitar strings if left untreated, constrained layer damping treatments may be used on the spokes themselves. Similarly, high damping coefficient materials may be designed into the root flanges near the powerplant or rotor bearing assembly. High damping coefficient materials may also be designed into washer or mount assemblies and/or the adjustable tip devices. All of these vibration damping treatments may be used alone or together to damp out vibrations induced by the rotor and/or powerplant. In addition to the passive end damping treatments, active damping treatments may be employed by using active materials like piezoelectric, electrostrictive or magnetostrictive actuators integrated in the spoke root grapple or washer assemblies. Some of these assemblies may be switched on and off depending on flight state. For instance, when the aircraft is operating near the ground, active acoustic damping may be employed to further suppress transmitted vibrations. However, once the aircraft is airborne, the system may be reversed such that vibrations transmitted to the spokes may be used to generate electrical energy.

The cross-sectional shape of the spokes is such that drag will be minimized and flow turning may be executed. Minimizing drag often requires flattened form factors. Flow turning often results when the spokes are canted to the oncoming flow and/or cambered. Such flow turning may be used to optimize the flow preswirl entering the rotor system, thereby increasing thrust generating capability of the rotor system.

Because the spokes have very slender profiles and high aspect ratios, the drag per spoke is minimized. Accordingly, high numbers of spokes may be used for several purposes. The first is to enhance operator safety. If the spoke spacing is so tight that no human body part can fit between the spokes, then such an arrangement may be used upstream of the rotor system to make for a comparatively safe rotor system for use around people. Such a radial pattern may be augmented by orthogonal strips, wires or straps arranged in a circular, concentric pattern to both laterally retard deflections and enhance safety by making it difficult if not impossible for body parts to enter the duct from the upstream or downstream sides.

Another benefit of high numbers of spokes is that they provide a high level of dimensional stiffness and stability for the duct itself. Such dimensional stiffness and stability is important as it retards ovality mode vibrations at low frequencies. With high numbers of spokes, the duct is typically forced into higher frequency modes, which most often have lower amplitudes and higher modal damping than low frequency duct vibration modes.

While a pure radial spoke has high radial stiffness and therefore retards ovality mode vibrations, multicross spoke patters can be used to tailor the structural dynamics of the entire system. When coupled with the rotor system, the ability to tailor the structural dynamics is important to avoid inadvertently exciting system-level natural frequencies. Pluralities of spokes upstream and downstream of the rotor may be used. In an embodiment, the spokes do not to lie within a plane parallel to the rotor tip path plane, which allows for transfer of thrust loads as well as centering and truing of the propulsor within the duct. Because thrust loads are typically greater in one direction than another, it is expected that the number of spokes needed to transfer thrust loads will not be the same between two or more spoke assemblies. Because electrical energy and/or fuel may be transferred via a non-structural secondary line located just below the structural member of the spoke, several holes are typically needed in both the duct and the central hub flange.

Because the spokes will take up vibration loads, and primarily accept thrust loads, they are typically canted at angles with respect to the tip path plane of the rotor, fan or impellers. Such a tilt angle allows for the entire assembly to be trued not only in a radial direction but also in an axial direction.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
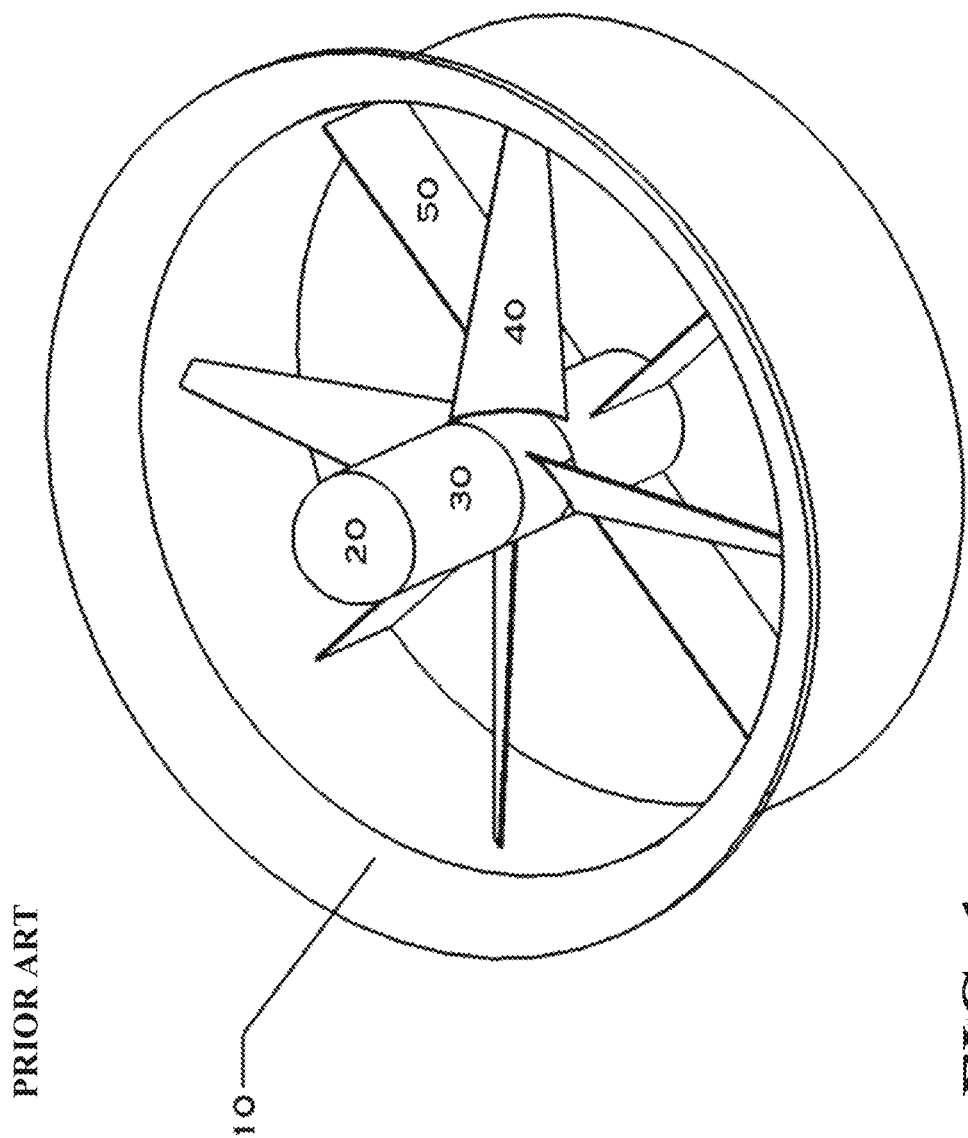
FIG. 1 shows a typical ducted fan assembly according to the prior art.
Figure 2:
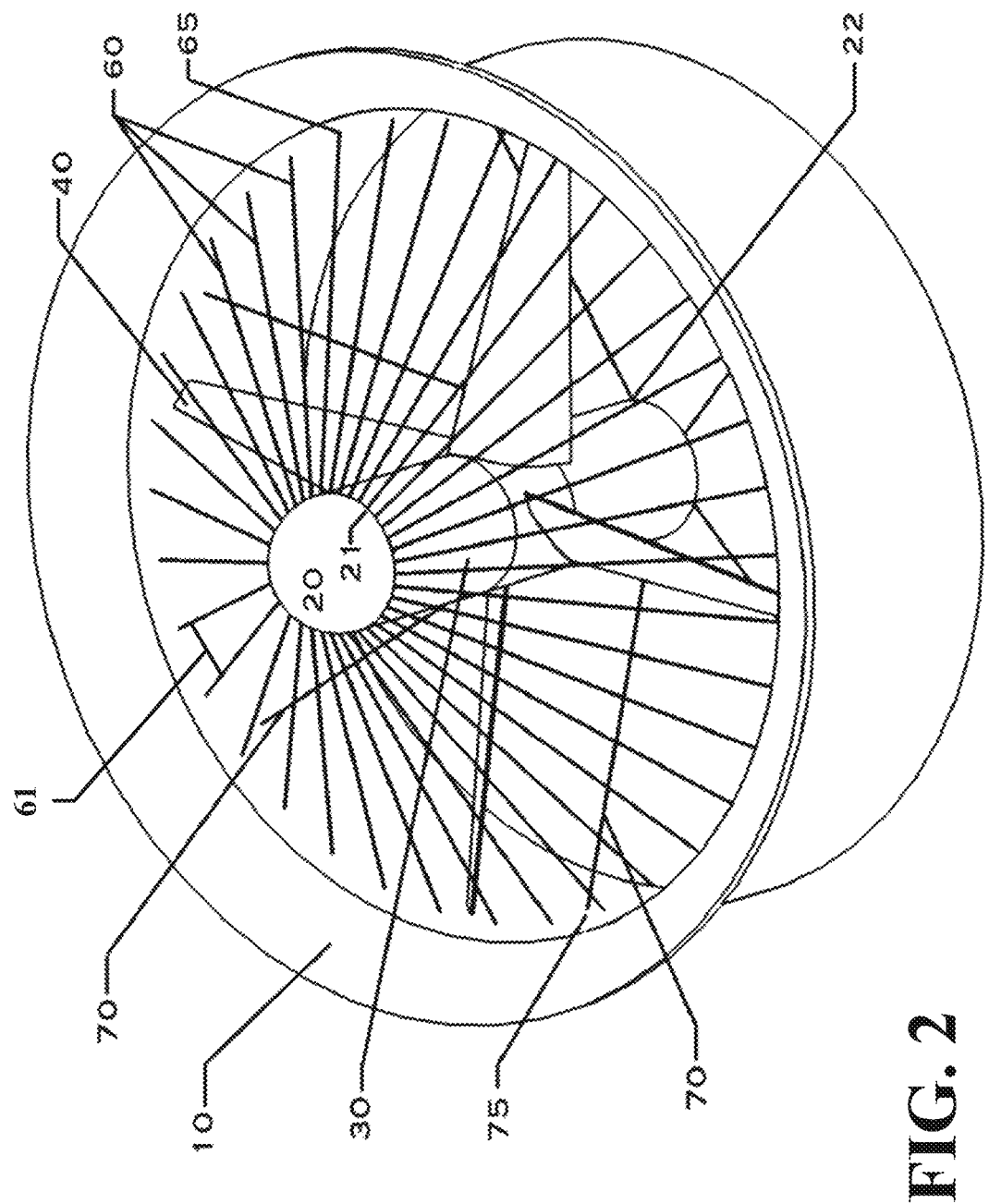
FIG. 2 shows an embodiment of a radial spoke pattern for a ducted fan propulsor mounting arrangement in accordance with the present disclosure.

Referring to FIG. 2, an embodiment of a radial spoke pattern for a ducted fan propulsor mounting arrangement in accordance with the present disclosure is shown. As shown in FIG. 2, the ducted fan propulsor mounting arrangement in accordance with the present disclosure may include an outer duct (10), central shaft assembly (20) and/or powerplant (30), as well as a fan, impeller, propeller or propulsor (40). An inside wall of the outer duct (10) may be treated with a "rub strip" which will be in direct contact with the tip of the fan blade (40) and be eroded as the fan blade spins. This rubbing motion will shape the rub strip more and more as the blades wear into the structure. In an embodiment, acoustic absorbing treatments, such as Helmholtz resonators, may be contained in both the skin of the duct wall (10) as well as the central shaft assembly (20).

One or more spoke mounting flanges (21, 22) may be mounted somewhere on or near the central shaft assembly (20), and/or powerplant (30). The upper spoke mounting flange(s) (21) supports three or more aft-swept spokes (60) going from upstream at the central core to a more downstream position on the duct (10), terminating at forward spoke mounts (65). Three or more forward-swept spokes (70) transfer loads from a lower mounting flange (22) going from downstream at the central core to a more upstream position on the duct (10), terminating at aft spoke mounts (75). In an aspect, the two spoke arrangements may solely lie upstream of the fan, impeller, propeller or propulsors. In an additional or alternative aspect, the two spoke arrangements may straddle the fan, impeller, propeller or propulsors, may be interdigitated between multiple fan, impeller, propeller or propulsor assemblies or may lie solely downstream of the fan, impeller, propeller or propulsors. Additionally, it is noted that FIG. 2 illustrates a radial spoke pattern for purposes of illustration, rather than by way of limitation and that other spoke weave patterns could be utilized in accordance with embodiments of the present disclosure to tailor the absorption and transfer of thrust, drag, sideforce, torque and vibration loads.

Figure 3:
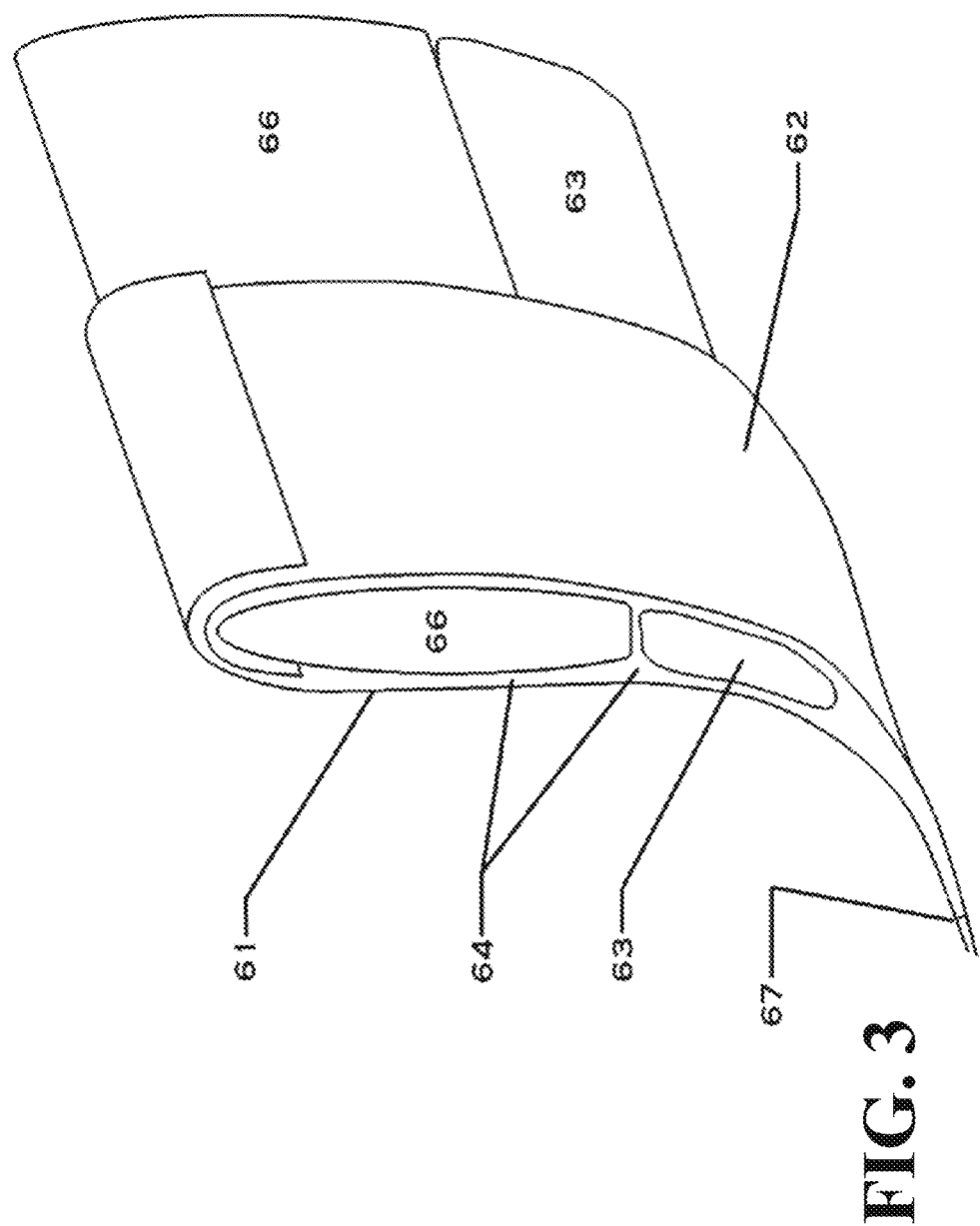
FIG. 3 shows an embodiment of a representative spoke cross-section with constrained layer damping treatments and secondary conduit in accordance with the present disclosure.

Unlike conventional ducted fan stators, which have low aspect ratios, the aft and forward-swept spokes (60, 70) may be almost exclusively loaded in tension at their mid-span points because of their extremely high aspect ratios. As described briefly above, the high aspect ratios utilized by the spoke assemblies may make them susceptible to vibrations of various kinds. To mitigate these vibrations a constrained-layer damping design is employed. Because these spokes are exposed to high speed flows, it is imperative to reduce cross-sectional drag forces. Referring to FIG. 3, an embodiment of a representative spoke cross-section with constrained layer damping treatments and secondary conduit in accordance with the present disclosure is shown. The central load-bearing member of the spoke is the spoke structural core (66). In an embodiment, the spoke structural core may be formed from steel, graphite, boron or another structurally strong member with tensile yield stresses well in excess of 100 thousand-pounds per square inch (ksi). Fiber-composite variants of the structural core may be made of axially oriented fibers held together by a structural matrix. Just aft of the structural core is one or more secondary spoke conduits (63). The one or more secondary spoke conduits may transfer electrical signals and/or electrical power as well as fuel, oil, air or other fluids. The spoke structural core and the one or more secondary spoke conduits may be aerodynamically shaped and designed to be bonded within a spoke assembly. The structural core and secondary conduit(s) may be held together by a pair of constraining layer facing sheets (61, 62). These facing sheets may be bonded to the structural core and secondary conduit(s) by a layer of viscoelastic resin (64). This arrangement of a pair of constraining layers and viscoelastic resin forms a constrained layer-damper (CLD) assembly. The CLD assembly may be composed with facing sheets of any material and may also include structural or nonstructural fibers embedded in the constraining layer (64). This CLD assembly may be tailored to damp out vibrations transverse to the cross-section of the spoke assembly in both the streamwise and cross-wise directions. The CLD sheets may also be geometrically tapered in any dimension along the length of the spoke.

Aerodynamically, the CLD spoke assembly is designed to have a rounded leading edge which is designed to take high-order impact loads from physical objects and/or body parts. The two constraining sheets (61, 62), are designed to shear against each other and the structural components within to absorb vibrational energy. The trailing edge of the sheets are designed with a high level of camber and meet each other at the cambered trailing edge (67), but do not touch as there lies between them a viscoelastic layer of material allowing for shear deformations. The camber of the spoke assembly is designed to preswirl the flow entering the rotor system, thereby boosting propulsive efficiency.

Figure 4:
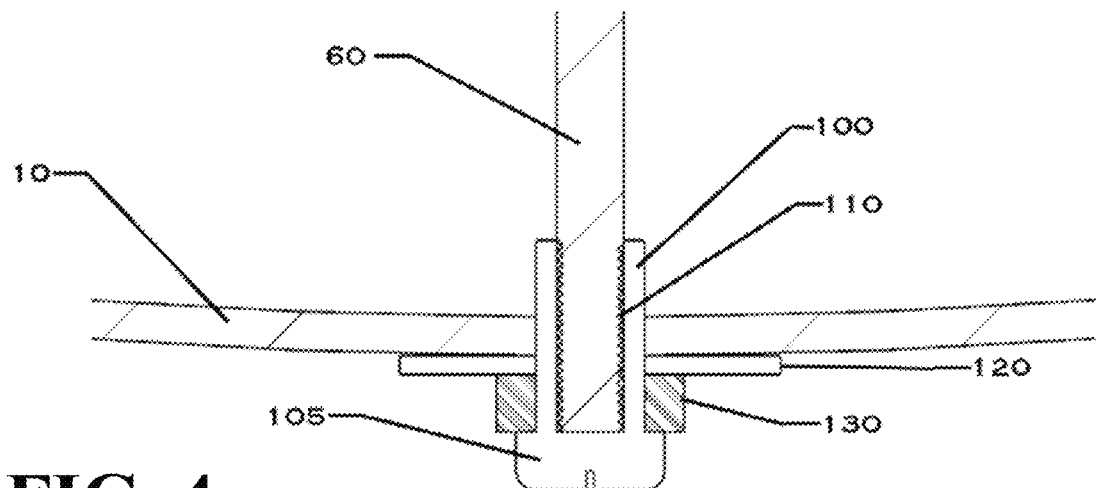
FIG. 4 shows an embodiment of a spoke head which has been tailored for both load transfer and to maximize damping in accordance with the present disclosure.

Referring to FIG. 4, an embodiment of a spoke head which has been tailored for both load transfer and to maximize damping in accordance with the present disclosure is shown. As illustrated in FIG. 2, a fixture, including a spoke terminus, may terminate at the mounting flange (21/22) and/or forward or aft spoke mounts (65, 75). This spoke terminus shows a rounded portion of the spoke structural core (60) as it approaches the duct wall (10). It is noted that the fixture may include one or more components (e.g., washers, threaded fittings, nuts, washers, bosses, and the like) configured to couple the spokes to a portion of the central shaft assembly (e.g., a portion of the powerplant, such as a powerplant ring, or a rotor guard). The spoke structural core (60) may be threaded and inserted within a match-threaded spoke head barrel (100). The spoke head barrel may be an integral part of the spoke head (105), which includes a mechanism for tightening and/or otherwise adjusting the spokes via a turning motion. The spoke head barrel can also have flats which enable tightening and/or adjusting of spokes. A structural washer (120), distributes applied point loads into the outer duct housing (10). A damping washer (130) may be positioned between the spoke head and the structural washer. The damping washer (130) may be made of a vibration damping material, such as an elastomeric polymer and/or a shape-memory alloy. The damping washer (130) may help retard the transmission of axial vibration loads from the spoke (60) to the duct wall (10).

Figure 5:
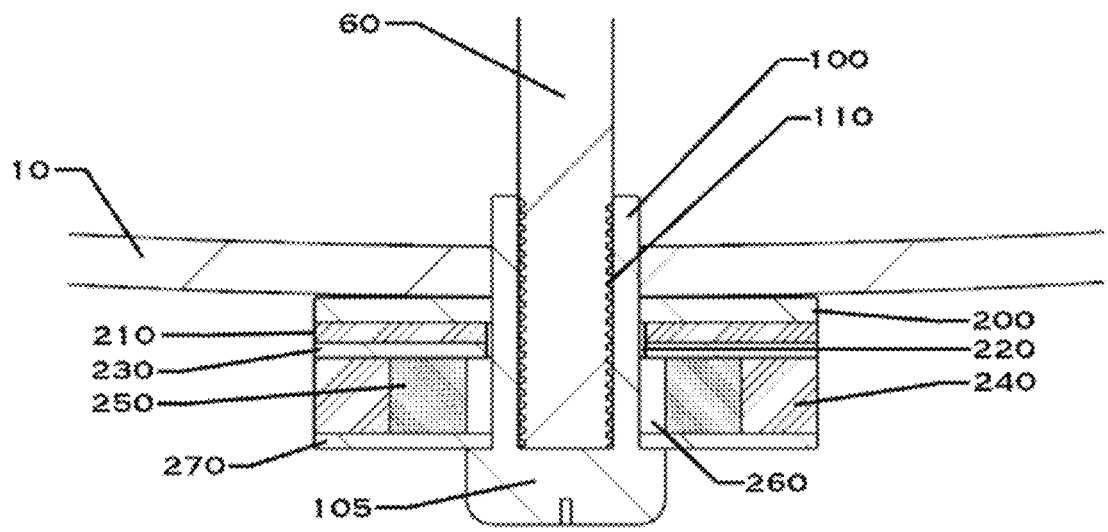
FIG. 5 shows an embodiment of a spoke head configured to provide active damping in accordance with the present disclosure.

A passive damping approach, such as the arrangement illustrated in FIG. 4, may not be enough for some applications. In such instances, an active approach to vibration load transfer may be taken. For example and referring to FIG. 5, an embodiment of a spoke head configured to provide active damping in accordance with the present disclosure is shown. As shown in FIG. 5, the active vibration damping head may employ layers of electrical insulation (210, 220, 260) configured to electrically isolate a piezoelectric element (250) from the surrounding structure. An outer structural washer (270) transfers loads from the spoke head (105) to the rest of the assembly. The piezoelectric element (250) may be used to actively damp out sensed axial vibrations in the spoke (60). Structural mounting materials (230, 240) aid in centering and isolating the piezoelectric element (250). The piezoelectric element (250) may be designed to expand and/or contract in the through-thickness direction in response to electrical signals. Because vibration damping is not always needed, the system can be run in reverse. Indeed, the piezoelectric element (250) itself may be used to convert vibrational energy into electrical energy, thereby scavenging power from the system when high acoustic damping levels are not needed.

Figure 6:
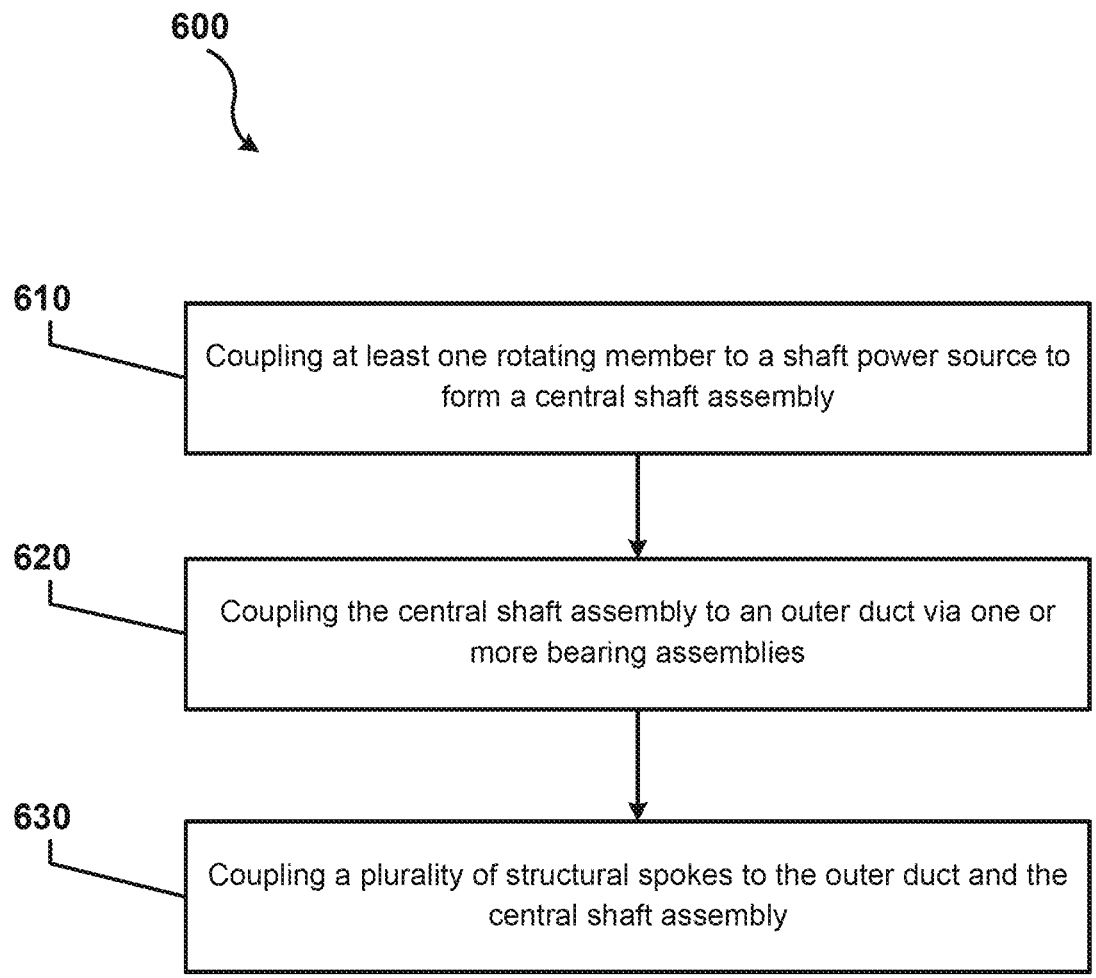
FIG. 6 is a flow diagram of a method for mounting components of a ducted fan assembly in accordance with the present disclosure.

Referring to FIG. 6, a flow diagram of a method for mounting components of a ducted fan assembly in accordance with the present disclosure is shown as a method 600. As shown in FIG. 6, the method 600 includes, at 610 coupling at least one rotating member to a shaft power source to form a central shaft assembly. In an aspect, the at least one rotating member may include at least one of: a fan, a propeller, an impeller, and a rotor. In an aspect, the shaft power source may include an external drive shaft, an electric engine, an internal combustion engine, or a turbine engine. At 620, the method 600 includes coupling the central shaft assembly to an outer duct via one or more bearing assemblies. The outer duct may be configured to allow air to enter on a first end of the outer duct and eject the air from a second end of the outer duct. The one or more bearing assemblies may be configured to rotatably secure the at least one rotating member within the outer duct and to transfer thrust loads between the outer duct and the central shaft assembly. At 630, the method 600 includes coupling a plurality of structural spokes to the outer duct and the central shaft assembly. In an aspect, the structural spokes may be configured in accordance with the structural spokes described herein with reference to FIGS. 2-5 and may be configured to transfer loads between the outer duct and at least a portion of the central shaft assembly. Additionally, each structural spoke of the plurality of structural spokes may have a high aspect ratio, such as an aspect ratio of 9 or greater. Additionally, the plurality of structural spokes may include aft-swept structural spokes and forward-swept structural spokes. Each structural spoke may be differentially tightened and otherwise trimmed to very exactingly center the propulsive core and fan assembly, thereby allowing very precise alignment and maintenance of tight rotor-tip-to-duct tolerances.

In an aspect, coupling the plurality of structural spokes to the central shaft assembly may include coupling a plurality of fixtures to the central shaft assembly. Each fixture of the plurality of fixtures may correspond to one structural spoke of the plurality of structural spokes and may be configured to couple a first end of the corresponding structural spoke to the central shaft assembly. Additionally, the coupling of the plurality of structural spokes to the outer duct may include coupling a plurality of structural spoke mounting assemblies to the outer duct. Each structural spoke mounting assembly of the plurality of structural spoke mounting assemblies may correspond to one structural spoke of the plurality of structural spokes and may be configured to couple a second end of the corresponding structural spoke to the outer duct. As described above with reference to FIGS. 4 and 5, each the plurality of structural spoke mounting assemblies may be configured to tighten the corresponding structural spoke and to minimize the transfer of axial spoke vibrations to a wall of the outer duct.

In an aspect, the plurality of structural spoke mounting assemblies may include at least one of piezoelectric actuators, electroresistive actuators, and magnetostrictive actuators configured to actively minimize the transfer of the axial spoke vibrations to the wall of the outer duct and/or generate electricity by converting vibrational energy to electrical energy. In an additional aspect, the plurality of structural spoke mounting assemblies may be configured to passively minimize the transfer of the axial spoke vibrations to the wall of the outer duct. In an aspect, the method 600 may also include applying a layer damping treatment to at least one of the plurality of structural spokes and the outer duct and/or applying an acoustic vibration reduction treatment to at least one of an inside of the outer duct and a portion the central shaft assembly, wherein the acoustic vibration reduction treatment is configured to absorb acoustic energy. The method 600 may also include mounting at least one rub strip to the outer duct. The method 600 may also include connecting two or more structural spokes together using one or more spoke cross-members. This may provide a tighter mesh between the two or more structural spokes and prevent a foreign object or body part from being ingested into the ducted fan assembly.

As explained above, ducted fan assemblies configured in accordance with aspects of the present disclosure may provide improved performance when compared to existing ducted fan assemblies, such as fan assemblies that include stators that have a low aspect ratio. For example, a ducted fan assembly configured in accordance with the method 600 of FIG. 6 and the ducted fan assemblies described and illustrated with reference to FIGS. 1-5 may provide improved dimensional stability, sound damping, and vibration damping. Acoustic noise mitigation is enhanced as the flow structures trailed by spokes upstream of the rotor will bear fine flow structures. Because a high plurality of spokes may also be used to enhance operator safety by mitigating foreign body ingestion, the ingestion of many fine structures may place the principal acoustic signatures outside of the peak of the human audible spectrum and other acoustic spectra (like the weighted dBA spectrum). This means the noise generated by the duct will appear to be far lower to humans than that of conventional ducted fan designs. Additionally, because the spokes provide a high level of mechanical stability to the outer duct when considering ovality vibration modes, such vibration mode amplitudes will be decreased substantially. Further, higher order vibration modes typically have higher modal damping than low modes in the same structure, thereby retarding vibrations and acoustic radiation from the duct itself.

In Table 1 below, measurements observed for various duct assembly configurations positioned 1.5 feet above ground level (AGL) and 4.5 feet AGL are shown.

TABLE 1

| Configuration | 1.5 ft AGL | 4.5 AGL |
|---|---|---|
| Wire Teflon Spokes | 74.8 dB | 68.9 dB |
| Steel Rod Spokes (1" from Prop) | 76.1 dB | 73.0 dB |
| Duct Only | 77.1 dB | 74.1 dB |
| Bike Wheel (1.125" above Prop) | 79.9 dB | 75.8 dB |
| Balsa Cross Stators (1.125" above Prop) | 75.9 dB | 74.1 dB |
| Metal Cross Stators (6.125" above Prop) | 79.0 dB | 74.0 dB |
| Two Inch Metal Stator (6.5" above Prop) | 78.2 dB | 75.4 dB |
| Two Inch Balsa Stator (4" above Prop) | 76.7 dB | 73.3 dB |

The measurements illustrated in Table 1 were observed while operating each duct assembly configuration at between 2440 to 2500 revolutions per minute. As can be seen from Table 1, duct assembly configurations that utilized spokes in accordance with the present disclosure exhibited improved noise reduction relative to the other duct assembly configurations.

In Table 2 below, sound levels for various duct assembly configurations observed at different distances are shown.

TABLE 2

| Configuration | 5 ft. | 10 ft. | 20 ft. | 30 ft. |
|---|---|---|---|---|
| Wire Teflon Spokes | 68.9 dB | 64.1 dB | 57.1 dB | 54.2 dB |
| Steel Rod Spokes (1" from Prop) | 73.0 dB | 67.3 dB | 61.0 dB | 58.4 dB |
| Duct Only | 73.3 dB | 67.2 dB | 61.2 dB | 58.2 dB |

Figure 7:
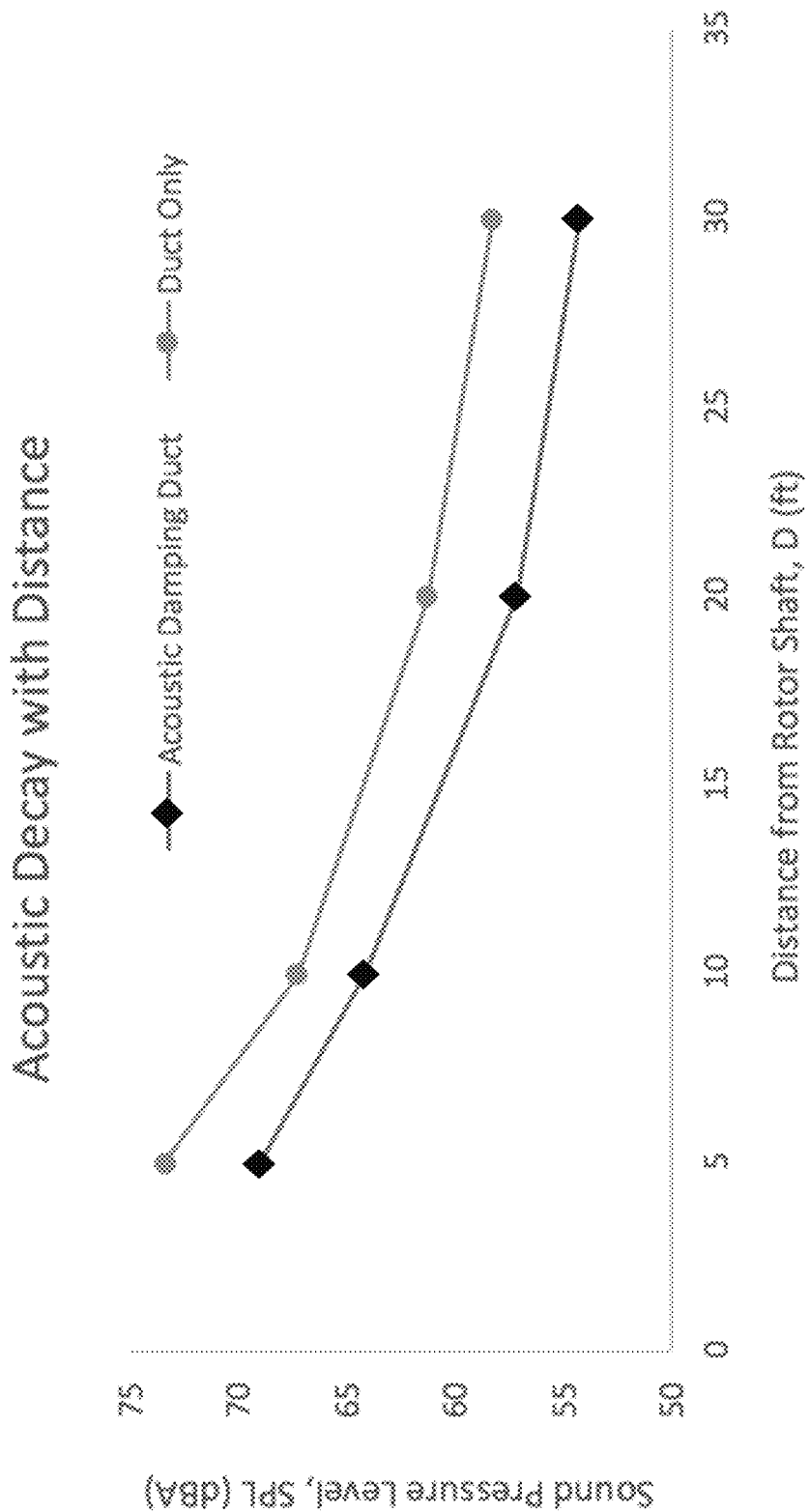
FIG. 7 is a graph comparing observed acoustic decay for various duct assemblies.

Similar to the results illustrated in Table 1, the data shown in Table 2 demonstrates that duct assembly configurations utilizing spokes in accordance with the present disclosure exhibit reduced noise levels as compared to configurations that do not utilize spokes. The data illustrated in Table 2 is illustrated graphically in FIG. 7.

As mentioned earlier, the aerodynamic shapes of the spokes may be small and slender, allowing many spokes to be used without a significant thrust performance penalty. This may be important for inhabited aircraft design as it allows designers to prescribe such tight spoke pitch patterns that it would be difficult, if not impossible for humans to get body parts sucked into such a duct. In addition to enhancing operational safety, it may also help demonstrate compliance with regulations such as those found in Federal Aviation Regulation (FAR) part 21 and lower liability risks and therefore insurance costs. Finally, the slender, cambered shapes of the spokes generates a favorable inflow swirl which may allow the ducted fan assembly to generate significantly more thrust than an assembly with no upstream swirl. Similarly, downstream spokes may be used to generate thrust by deswirling the flow as it exits the ducted fan assembly, thereby further enhancing propulsive efficiency. Additionally, utilizing a plurality of spokes in accordance with the embodiments described above with respect to FIGS. 2-6 enables lighter ducted fan assemblies to be constructed. It is noted that although FIGS. 2-7 primarily describe embodiments of the present disclosure with reference to ducted fans, the concepts disclosed herein are not limited solely to ducted fans. For example, the concepts disclosed herein may be readily utilized to improve turbine engines, airboat and marine propulsors, and the like.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimd is:

1. An acoustic noise suppressing mounting arrangement for a ducted fan assembly comprising:
    an outer duct through which air is entrained on one end and ejected on the other; a central shaft assembly comprising:
        at least one rotating member, wherein the at least one rotating member comprises at least one of a fan, a propeller, an impeller, and a rotor; and
        a shaft power source configured to provide shaft power to the at least one rotating member, wherein the shaft power source comprises an external drive shaft, an electric engine, an internal combustion engine, or a turbine engine; and
        one or more bearing assemblies configured to rotatably secure the at least one rotating member within the outer duct and to transfer thrust loads between the outer duct and the central shaft assembly; and
    a plurality of structural spokes coupled to the central shaft assembly and configured to transfer loads between the outer duct and at least a portion of the central shaft assembly, wherein each structural spoke of the plurality of structural spokes is pretensioned and has a high aspect ratio.

2. The acoustic noise suppressing mounting arrangement of claim 1, wherein the plurality of structural spokes comprise a first structural spoke arrangement and a second structural spoke arrangement.

3. The acoustic noise suppressing mounting arrangement of claim 2, wherein the first structural spoke arrangement comprises aft-swept structural spokes and the second structural spoke arrangement comprises forward-swept structural spokes.

4. The acoustic noise suppressing mounting arrangement of claim 1, wherein the plurality of structural spokes are positioned upstream of the fan, the propeller, the impeller, or the rotor.

5. The acoustic noise suppressing mounting arrangement of claim 1, wherein the plurality of structural spokes are positioned downstream of the fan, the propeller, the impeller, or the rotor.

6. The acoustic noise suppressing mounting arrangement of claim 1, further comprising a second rotating member, wherein the second rotating member comprises at least one of a second fan, a second propeller, a second impeller, and a second rotor, and wherein the plurality of structural spokes are positioned between the at least one rotating member and the second rotating member.

7. The acoustic noise suppressing mounting arrangement of claim 1, wherein the plurality of structural spokes are positioned upstream of the fan.

8. The acoustic noise suppressing mounting arrangement of claim 1, wherein each of the plurality of structural spokes is configured to damp out vibrations transfer to a cross-section of the spoke.

9. The acoustic noise suppressing mounting arrangement of claim 1, further comprising a plurality of fixtures, each fixture of the plurality of fixtures corresponding to one structural spoke of the plurality of structural spokes and configured to couple a first end of the corresponding structural spoke to the central shaft assembly.

10. The acoustic noise suppressing mounting arrangement of claim 1, further comprising a plurality of structural spoke mounting assemblies, each structural spoke mounting assembly of the plurality of structural spoke mounting assemblies corresponding to one structural spoke of the plurality of structural spokes and configured to couple a second end of the corresponding structural spoke to the outer duct, wherein each the plurality of structural spoke mounting assemblies is configured to tighten the corresponding structural spoke and to minimize transfer of axial spoke vibrations to a wall of the outer duct.

11. The acoustic noise suppressing mounting arrangement of claim 1, wherein the plurality of structural spoke mounting assemblies comprise at least one of piezoelectric actuators, electroresistive actuators, and magnetostrictive actuators.

12. The acoustic noise suppressing mounting arrangement of claim 11, wherein the plurality of structural spoke mounting assemblies are configured to actively minimize the transfer of the axial spoke vibrations to the wall of the outer duct.

13. The acoustic noise suppressing mounting arrangement of claim 11, wherein the plurality of structural spoke mounting assemblies are configured to generate electricity by converting vibrational energy to electrical energy.

14. The acoustic noise suppressing mounting arrangement of claim 1, further comprising at least one of a layer damping treatment applied to each structural spoke of the plurality of structural spokes, the outer duct, or both.

15. The acoustic noise suppressing mounting arrangement of claim 1, wherein at least one structural spoke of the plurality of structural spokes comprises a secondary conduit configured to transfer at least one of electrical energy, signals, and fluids.

16. The acoustic noise suppressing mounting arrangement of claim 1, wherein each structural spoke of the plurality of structural spokes is configured to preswirl a flow entering the outer duct or swirl a flow exiting the outer duct.

17. The acoustic noise suppressing mounting arrangement of claim 1, further comprising acoustic vibration reduction treatments applied to at least one of an inside of the outer duct and a portion the central shaft assembly, wherein the acoustic vibration reduction treatment is configured to absorb acoustic energy.

18. The acoustic noise suppressing mounting arrangement of claim 1, further comprising rub strips mounted to an inner wall of the outer duct.

19. The acoustic noise suppressing mounting arrangement of claim 1, further comprising one or more spoke cross-members configured to connect two or more structural spokes together.

20. The acoustic noise suppressing mounting arrangement of claim 19, wherein the one or more spoke cross-members are configured to prevent a foreign object or body part from being ingested into the ducted fan assembly.

* * * * *

UNITED STATES PATENT AND TRADEMARK OFFICE
CERTIFICATE OF CORRECTION

PATENT NO. : 12,195,167 B2
APPLICATION NO. : 18/451619
DATED : January 14, 2025
INVENTOR(S) : Ronald Martin Barrett et al.

Page 1 of 1

It is certified that error appears in the above-identified patent and that said Letters Patent is hereby corrected as shown below:

In the Specification

At Column 1, Line number 19, delete "Grant No. DTOS59-06-G-" and replace with --Grant No. DTOS59-06-G-0047--.

Signed and Sealed this
Twenty-fifth Day of February, 2025

Coke Morgan Stewart
*Acting Director of the United States Patent and Trademark Office*